United States Patent Office 2,735,527
Patented Feb. 21, 1956

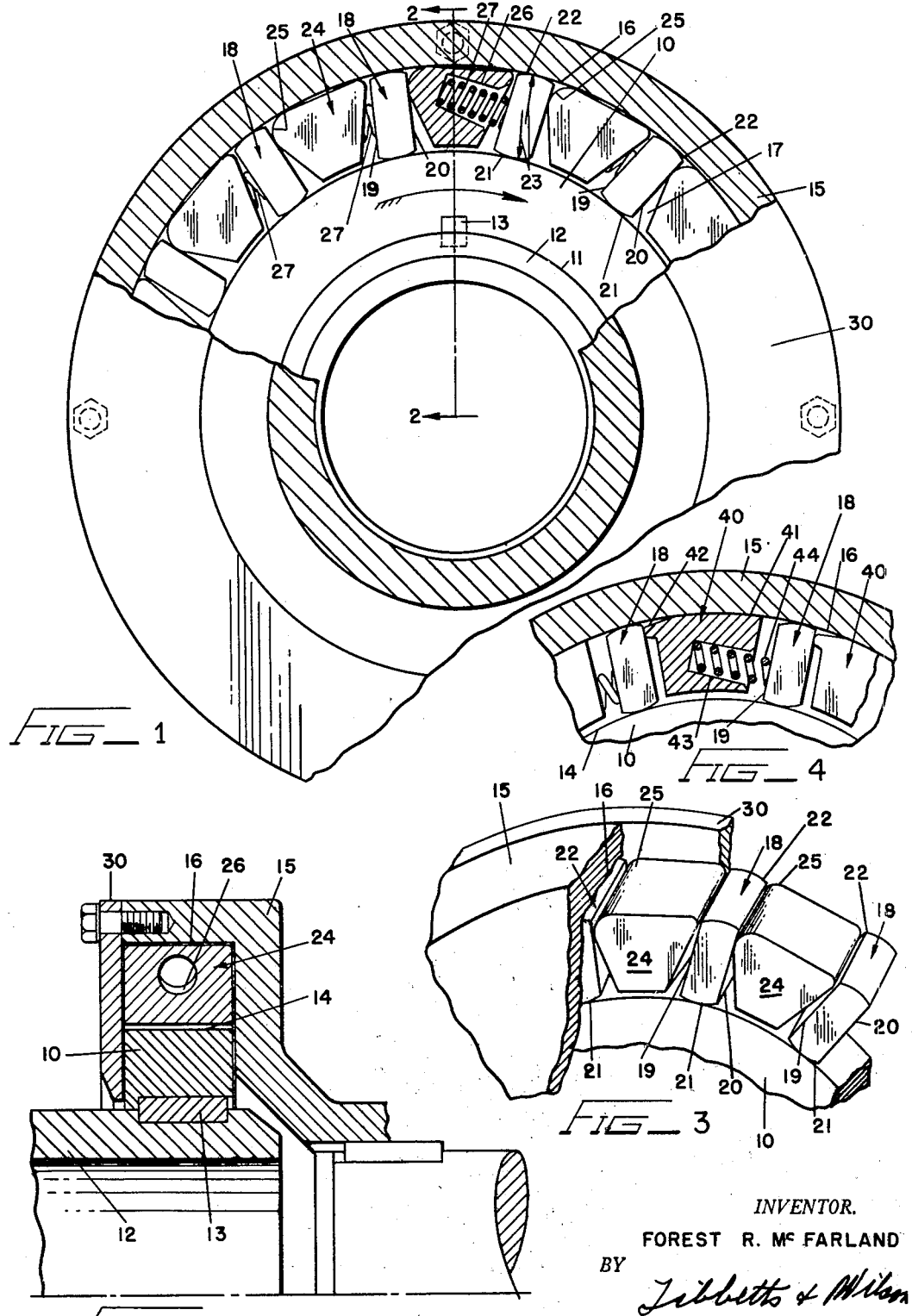
Feb. 21, 1956  F. R. McFARLAND  2,735,527
TRAPPED SPRING SPRAG CLUTCH
Filed Oct. 15, 1951
INVENTOR.
FOREST R. McFARLAND
ATTORNEYS

2,735,527

TRAPPED SPRING SPRAG CLUTCH

Forest R. McFarland, Huntington Woods, Mich., assignor to Studebaker-Packard Corporation, a corporation of Michigan Application October 15, 1951, Serial No. 251,307

3 Claims. (Cl. 192—45.1)

This invention relates to one-way coupling devices and more particularly to an overrunning clutch of the sprag type.

The sprag or gripper type of one-way clutch is basically simpler than the roller-and-cam type since the former uses two circular races whereas the latter uses one circular race and one multiple cam race. It is much easier to form a circular race than a multiple cam, the circular race being formed on a lathe and cylindrical grinder but the multiple cam requiring either a milling operation or a broaching operation, with subsequent flat grinding and indexing, both of which operations are relatively slow and expensive.

The operation of a sprag type of one-way device depends upon the application of a turning moment upon a plurality of oscillatable sprags or gripper means disposed between two circular races. The grippers or sprags as they are called, are rotated out of high pressure contact with the circular races when relative rotation between the races is in one direction and are resiliently urged into contact at all times regardless of the direction of relative rotation of the races, the pressure becoming high and therefore becoming effective to lock the races together due to the increased friction between the sprags and members when the direction of relative rotation is reversed. Various means have been devised for resiliently urging the sprags into contact, but for the most part such means are either difficult to assemble or else are expensive to make.

The principal object of this invention is to provide a one-way coupling device of the sprag type which uses an inexpensive means for resiliently urging the sprags of the device into contact with its circular races.

A more specific object of this invention is to provide a resilient means for bringing the sprags of a one-way coupling device into light uniform contact with the races, an inexpensive support is used for the resilient means, such as a die casting or any other accurately molded product, thereby saving the expense of a machined element for this purpose. Since one such support is used for each sprag, it is apparent that the use of die cast or similarly accurately formed supports effects a great saving in the manufacture of the one-way coupling device.

A still more specific object of this invention is to provide a simple die casting that serves as an accurately formed support for housing the resilient means of a sprag type of one-way coupling device, the support having therein a recess for receiving a resilient member which may be a coil type of spring, and the support and recess being so disposed with respect to the sprags that when the supports and sprags are assembled in the device, the resilient members are trapped and thus require no special holding means to keep them in place.

These and other objects of this invention will become apparent from the following detailed description when taken in connection with the accompanying drawings. It is to be understood, however, that the invention is not considered to be limited in its application to the details of construction and the particular arrangement of parts here shown. It will be obvious that the invention is capable of other embodiments and of being practiced or carried out in various ways. Also it is to be understood that the phraseology or terminology employed herein, is for the purpose of description and not of limitation.

Referring to the drawings:

Fig. 1 is a front elevation of a sprag type of one-way device partly broken away to show the disposition of the sprags and the novel supports therefor;

Fig. 2 is a view taken on line 2—2 of Fig. 1, but with the spring removed for clarity;

Fig. 3 is a top plan section taken along line 3—3 of Fig. 1; and

Fig. 4 is a side elevation of a modified form of a sprag embodying this invention.

In the preferred embodiment of the invention here described the one-way clutch is shown disposed between a clutch surface or race on an inner member and a cooperating clutch surface or race formed integral with an outer rotating member. The inner member, as here shown, is keyed to the drive shaft while the outer member connected to the driven shaft and the sprag means of the clutch are disposed between the two members so as to transmit power when the inner member tends to rotate more rapidly than the outer member and yet the outer member may overrun the inner member when it tends to rotate more rapidly than the inner member.

Referring now to the drawings for a detailed description of the invention, the inner member 10 is shown, it being bored centrally as at 11 for receiving a tube or drive shaft 12 to which inner member 10 is secured against rotational movement by a key 13. The outer surface of inner member 10 is cylindrical and is suitably hardened and finished by grinding or the like so as to be perfectly smooth and round to form an inner race 14. Disposed concentrically with respect to inner member 10, is the outer member 15 having a cylindrical race surface 16 which is spaced from race surface 14 to form an annular space 17. Cylindrical race surface 16 of outer member 15 is similarly hardened and finished by grinding or the like so as to be perfectly smooth and round. The member 15 may be keyed to the driven shaft to transmit power thereto as will appear more fully below.

As above explained, the inner member 10 and outer member 15 are adapted to be coupled by the sprag clutch means to transmit torque from one to the other when the inner member tends to run faster than the outer member in a clockwise direction as indicated by the arrow in Figure 1 and to release or "free-wheel" when the speed of the inner member is relatively less than that of the outer member when both are rotating in a clockwise direction. While it is preferred that the inner member serve as the driving element, it is obvious that the outer member 15 could be the driver and inner member 10 the driven member. The specific embodiments of the inner member 10 and outer member 15 may be determined by the apparatus with which the coupling device is used and is not material to this invention.

Referring to the invention as shown in Figure 1, the one-way coupling of inner member 10 and outer member 15 is effected by means of a plurality of sprags or grippers 18, the intimacy of contact of which with the race surfaces 14 and 16, can be made greater or smaller merely by rotating each of the sprags about its individual axis which is parallel to the axis of the shaft 12. As here represented, each of the sprags have parallel sides 19 and 20 and curved end surfaces 21 and 22. For ease of manufacture, curved surfaces 21 and 22 are preferably made segments of circles the centers of which are laterally offset as shown by arrows 23 which represent the radii of said circles. This lateral offset results in varying the distances between curved inner surface 21 and curved outer surface 22 of each sprag at the point of tangency of these surfaces with surfaces 14 and 16 of inner member 10 and outer member 15, respectively, so that by rotating sprags 18 counter-clockwise as viewed in Figure 1, the sprags become more tightly engaged between surfaces 14 and 16 and thereby will frictionally couple inner member 10 with outer member 15.

The turning moment required to operate sprags 18 is provided in part by spacers 24 disposed between adjacent sprags 18. Spacers 24 preferably are coextensive axially with sprags 18 as seen in Figures 2 and 3, and are of such radial dimension as to substantially fill the annular space 17 between adjacent sprags, and the spacers are all spaced away from inner member 10 in order to avoid any possibility of the spacers becoming wedged between inner member 10 and outer member 15 which wedging action might interfere with the proper functioning of the overrunning clutch. Spacers 24 are formed with an axially extending rounded nose 25 disposed on the left side thereof as shown in Figure 1, which nose limits contact between the spacers and sprags to a region near the curved surfaces 21 disposed on the outer end of each sprag. This point of pressure of course is eccentric to the center of gravity of the cross section of the sprags as viewed in Figure 1, and hence any peripheral force exerted by surface 14 of the inner member 10 on the surfaces 21 of spacers tends to move them in a clockwise direction referring to Figure 1, and this motion coupled with the reaction of each of the sprags against the nose 25 of its respective spacer, will produce a counter-clockwise turning moment on the sprags to cause the sprags to bind tightly between race surfaces 14 and 16.

In the lower right-hand end of each spacer 24 as viewed in Figure 1, there is formed a recess 26 to receive a coil spring 27. By suitable modification, other forms of resilient means such as rubber or leaf springs may also be used when such means are not inconsistent with the use to which the device is to be put. Each recess 26 is so disposed as to hold its respective spring 27 with its axis substantially normal to the adjacent face 19 of the next adjacent sprag. The depth of each recess is such as to provide a space for spring 27 which is equal to the working height of the spring, the space being measured from the bottom of the recess to the side 19 of sprag 18. The recess 26 itself is deep enough to make it impossible for spring 27 to fall out of the recess or to assume a cocked position in the recess during the operation of the device. Thus spring 27 is trapped in recess 26 when the device is assembled and no special holding or securing means is required to keep it in place in the spacer.

It will be noted that in the preferred form of this invention, a pressure of spring 27 is directed substantially toward the center of gravity of the section of the sprags as viewed in Figure 1, but offset with respect to nose 25 of the spacer, so that a turning couple is produced that normally urges each sprag in a counter-clockwise direction as seen in Figure 1. Thus, each spacer tends to urge apart the outer portion of one sprag and the inner portion of the adjacent sprag. The spring pressure also urges each spacer 24 radially outward against race surface 16 of outer member 15, in the form shown, and out of contact with race surface 14 of inner member 10, to prevent any inadvertent wedging of the spacers. It is apparent of course that dimensional relationships between the annular space 17 and the radial dimension of the spacer 24 may be provided which will eliminate the possibility of contact between the spacer and either member of the coupling but the preferred structure is that described above.

It will be noted that the cross section of spacers 24 as shown by the crosshatched spacer element in Figure 1, is irregular. It is obvious, therefore, that in order to machine these spacers from bar stock, and in addition, to drill recesses 26 in each spacer, would require the performance of several relatively expensive machining operations.

There is relatively little stress on the spacers, however, their action being primarily to gently urge the sprags toward their operating position. If the direction of relative rotation is as described in connection with the structure shown in Figure 1, friction between the sprags and the contacting surfaces 14 and 16 will render the device immediately effective even though the spacer pressure holding the sprags in position is extremely light. In these circumstances and particularly to minimize the cost of mass producing the spacers, it is suggested that the spacers may be individually formed by a molding or casting operation, using alloys normally employed for die castings or a suitable moldable organic plastic material such as a thermosetting synthetic resin or the like. When manufactured in this manner each spacer including its recess 26 may be produced in one operation, and except for a tumbling or other flash removing operation, is ready for use substantially as cast.

The one-way clutch is completed when a cover or retainer plate 30 is bolted onto housing 15 to confine sprags 18 and spacers 24 within the annular space 17. The plate may however be easily removed to permit inspection or replacement of parts if necessary.

A modified form of the invention is shown in Figure 4 wherein the spacer 40 is disclosed which cooperates with sprags 18 substantially like the spacers 24 described above. It will be noted, however, that spacer 40 is formed to have an outer surface 41 that fits closely within surface 16 of outer member 15. The spacer 40 is provided with a nose 42 that engages surface 20 on the sprag nearest thereto and it also has a seat 43 for receiving spring 44 that bears against surface 19 of the next adjacent sprag. In this form of the invention, the spring 44 is directed against surface 19 of the sprag, in a region near the inner member 10 and referring to the showing in Figure 4, at a point somewhat below the center of gravity of the sprag section in order to increase the turning moment normally present for urging the sprag into gripping relation between race surfaces 14 and 16.

The assembly of either of the above described forms of the one-way clutch device is accomplished by means of suitable fixtures which hold the sprags and spacers in place as they are successively assembled around inner member 10. Various ways of effecting the assembly of the device will suggest themselves to those skilled in the art.

It will be understood that various forms of the invention other than that described above may be used, without departing from the spirit or scope of the invention.

What is claimed is:

1. A one-way coupling device comprising an inner member having a race on its periphery and an outer member that provides an outer race spaced from the inner member, a plurality of elongated sprags disposed in a spaced relation between the inner and outer races, said sprags being generally symmetrical about a center point and a plurality of spacers disposed one between each pair of adjacent sprags, said spacers being generally coextensive with said sprags so as to substantially fill the space between adjacent sprags but said spacers being spaced sufficiently away from said inner member to avoid any wedging thereof, each of said spacers having a nose formed on one side to contact one adjacent sprag, said nose portion being adapted to contact the side of the adjacent sprag at a location adjacent to its outermost edge, and an expandible resilient means fixedly disposed between the opposite side of the spacer and the other adjacent sprag of said pair, said resilient means bearing against said other sprag, said resilient means having its contact with said other sprag inwardly from the center point thereof, each sprag thus being acted upon by a contacting spacer and a resilient means to be urged into a gripping position between the inner and outer races.

2. A one-way coupling device comprising an inner member having a race on its periphery and an outer member that provides an outer race spaced from the inner member whereby a void is formed, a plurality of elongated sprags disposed in a spaced relation in said void between the inner and outer races, said sprags being generally symmetrical about a center point and a plurality of spacers disposed one between each pair of adjacent sprags, each of said spacers having sides converging radially inward and said spacers being generally-coextensive with said sprags so as to substantially fill the space between adjacent sprags but said spacers being spaced sufficiently away from said inner member to avoid any wedging thereof, each of said spacers having a nose formed on one side to contact one adjacent sprag, said nose portion being adapted to contact the side of the adjacent sprag at a location adjacent to its outermost edge, and an expandible resilient means fixedly disposed between the opposite side of the spacer and the other adjacent sprag of said pair, said resilient means bearing against said other sprag, said resilient means having its contact with said other sprag inwardly from the center point thereof, each sprag thus being acted upon by a contacting spacer and a resilient means to be urged into a gripping position between the inner and outer races.

3. A one-way coupling device comprising an inner member having a race on its periphery and an outer member that provides an outer race spaced from the inner member, a plurality of elongated sprags disposed in a spaced relation between inner and outer races, said sprags being generally symmetrical about a center point and a plurality of spacers disposed one between each pair of adjacent sprags, said spacers being generally co-extensive with said sprags so as to substantially fill the space between adjacent sprags but said spacers being spaced sufficiently away from said inner member to avoid any wedging thereof and each of said spacers also having a sprag engaging side, said engaging side having a contacting ridge portion adapted to contact the side of the adjacent sprag at a location adjacent to its outermost edge, and an expandible resilient means fixedly disposed between the opposite side of the spacer and the other adjacent sprag of said pair between which the spacer is positioned, said resilient means bearing against said other sprag, said resilient means having its contact with said other sprag inwardly from the center point thereof, each sprag thus being acted upon by a contacting ridge on the spacer and a resilient means having a contact point relatively widely spaced inwardly along a sprag from the contact point of its cooperating ridge whereby said sprag is urged into gripping position between the inner and outer races.

References Cited in the file of this patent

UNITED STATES PATENTS

| 1,596,599 | De Lavaud | Aug. 17, 1926 |
| 2,364,280 | Dodge | Dec. 5, 1944 |

FOREIGN PATENTS

| 914,771 | France | Oct. 17, 1946 |